Figure 1:
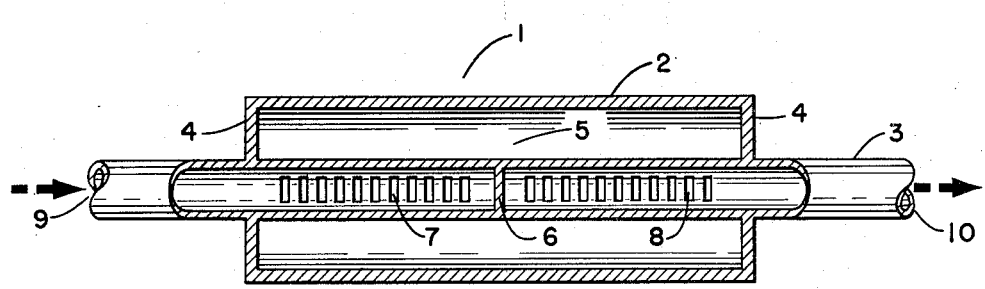

Jan. 15, 1957

L. E. POWELL ET AL 2,777,467

FLUID MIXING DEVICE

Filed June 9, 1954

INVENTORS.
LOYD E. POWELL AND
GLEASON TAPP
BY
*Floyd Trimble*
ATTORNEY

United States Patent Office 2,777,467
Patented Jan. 15, 1957

2,777,467
FLUID MIXING DEVICE

Loyd E. Powell and Gleason Tapp, Plainville, Kans.

Application June 9, 1954, Serial No. 435,461

2 Claims. (Cl. 138—37)

The present invention relates to a fluid mixing device which is of particular value in the treatment of oily materials containing water as an emulsion which will not separate readily into oil and water phases. More particularly our invention relates to an apparatus suitable for breaking emulsions comprising crude petroleum oils and water in various quantities.

Separating devices for oil-water emulsions have been proposed heretofore, but in general, these devices require the concurrent use of large quantities of heat and chemical emulsion breakers or these devices are complicated and expensive.

It is, therefore, a primary object of this invention to provide a separating device that is simple and inexpensive both in manufacture and in operation. It is another object of the present invention to separate oil from water with a minimum loss of the lighter hydrocarbons, so that the viscosity of the oil is kept at a minimum; and as a consequence, the oil may be easily pumped through pipe lines, a matter of great importance. It is yet another object of our invention to provide an apparatus which may be used for breaking oil-water emulsions without the necessity of heating the emulsion. Other objects and features of the invention will appear as the invention is more fully described.

In brief, the invention in one form consists of two concentric tubes or pipes, one of which is a pipe of relatively large diameter fitted with end plates through which a longer tube of a smaller diameter extends. Since the smaller tube is longer, the ends of the smaller tube extend beyond the ends of the larger or outer tube. That portion of the smaller tube located inside the larger tube is perforated either with round or slotted holes. To prevent the direct flow of liquid through the smaller tube it is fitted with an annular baffle plate at a point approximately midway between the ends of the outer tube thus dividing the smaller tube into intake and outlet portions. In operation the liquid flows into the smaller tube, strikes the baffle plate causing the liquid to be forced out through the perforations located in the inlet portion of the smaller tube into the passageway between the two tubes and then back into the inner tube through the perforations located in the outlet portion of the smaller tube.

The primary purpose of the apparatus is to accomplish thorough mixing of the emulsion with the chemical emulsion breaker. It is believed that additional effects are created by the impact of the fluid against the outer shell of the mixture; and in addition, the shearing action of the fluid passing through the various slots also assists in breaking the film of oil or paraffin from the water.

Figure 2:
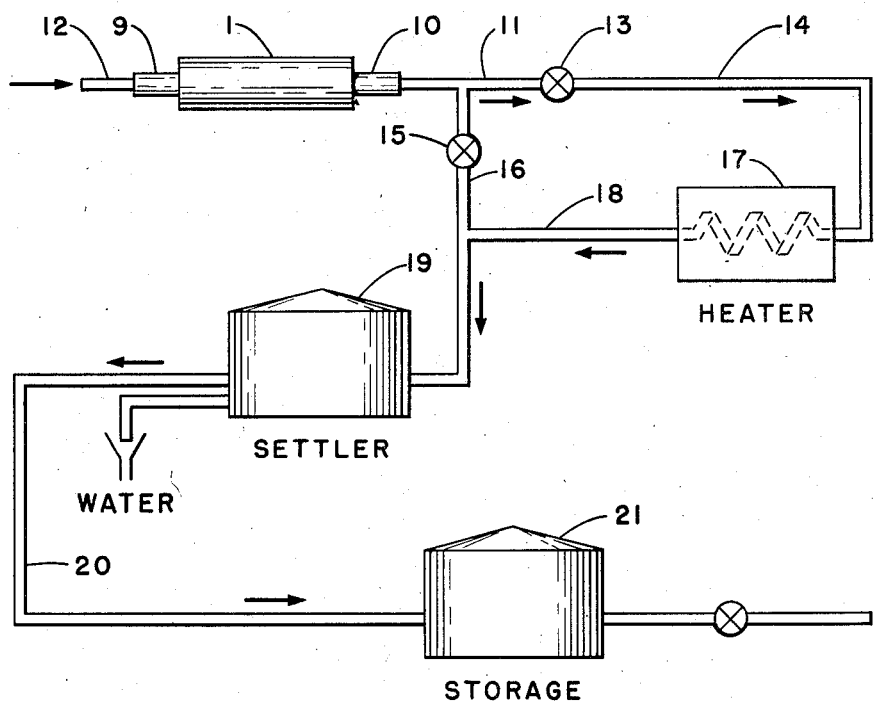

A more comprehensive concept of our invention and its application may be had from the following detailed description taken in conjunction with the accompanying drawings. In these drawings, Figure 1 is an elevation of one particular form of a mechanical emulsion breaker partly in section to show its interior. Figure 2 is a schematic diagram showing the application of our emulsion breaker used in conjunction with a settling tank, storage tank, heater, and necessary pipe lines.

Referring to Figure 1, number 1 denotes the mechanical emulsion breaker, 2 the outer tube, 3 the inner tube, 4 the end plates of the outer tube, 5 the outer section, 6 the blank off plate, 7 and 8 the perforations in the inner tube, 9 the oil-water emulsion inlet, and 10 the outlet or discharge for the oil-water emulsion. From outlet 10, the mixture flows through line 11 to the settling tank or heater 17 as is shown in Figure 2.

Referring to Figure 2, the crude oil containing emulsified water flows through line 12 into the mechanical emulsion breaker 1. If desired, a chemical such as "Visco Flerhenol A" which is a 74 percent sulfonated olive oil manufactured by Colgate Palmolive Peet Company of Jersey City, New Jersey, may be added to the emulsion prior to the addition of the latter to the emulsion breaker. The foregoing chemical is given by way of illustration only. Almost any of the chemical emulsion breakers available commercially may be used particularly those used in the separation of water from crude oil. Additional examples of chemical emulsion breakers or surface active agents which may be used include sulfonated oils, sulfonated fatty amides, etc. Specific examples of suitable chemicals include the sodium salt of the sulfuric ester of ethyloleylanilide, sodium diethyl hexyl sulfosuccinate, and the sodium salt of the sulfuric ester of diisobutyl oleylamide. Another suitable surface active agent is that prepared by condensing amylphenol with formaldehyde and then treating the polymer with ethylene oxide. Such a product is available commercially under the trade name "Tret-O-Lite F–90" from the Petrolite Corporation, Ltd., of New York, New York. In general, chemical emulsion breakers are complex compositions consisting of an organic sulfonate and a nonionic compound. The nonionic compound is formed by condensing ethylene oxide, propylene oxide, or mixtures of the two with glycerine or propylene glycol to give a high molecular weight compound which is then reacted with a dibasic acid.

From the mechanical emulsion breaker the emulsion flows into line 11 and then through heater 17 and then to settling tank 19 or direct to the settling tank by-passing the heater. If the heater is not used valve 13 is closed, valve 15 opened and as a consequence the emulsion flows through line 16 to settling tank 19 where the oil and water are separated. The oil layer is drawn off through line 20 to storage tank 21. When the heater is used valve 13 is opened, valve 15 closed and the emulsion flows through line 14 in heater 17. From the heater the emulsion flows through line 18 to settling tank 19 where the oil and water are separated and then the oil is added to storage.

The emulsion after passing through the mechanical emulsion breaker looks like untreated oil but if allowed to stand, the water and other impurities contained in the oil will settle out much more readily than they do in untreated oil. Generally 48 hours is sufficient for proper settling; we wish, however, to point out that in many cases this time can be reduced greatly.

As a specific example, a mechanical emulsion breaker was prepared consisting of two concentric tubes, one four-inches in diameter and the other seven-inches in diameter. The inner tube constructed from a piece of four-inch pipe 40 inches long was equipped with a ¼ inch thick annular blank off plate as shown in the drawing. Two rows of eight slots ¼ inch by 3 inches were cut in the four-inch pipe on each side of the plate to provide a passageway for the fluid. The seven-inch pipe 25 inches long was then centered over the slotted portion of the four-inch pipe and welded in place using ¼ inch steel plates.

In operation the emulsion breaking device was installed vertically at the tank battery at the heater with the slots in a horizontal plane. The oil, water, and emulsion breaking chemical entering at the bottom flow upward striking the blank off plate and then flow into the passageway between the two tubes through the slots. From the passageway, the liquid mixture returns to the internal section through the slots in the inner pipe above the blank off plate. While we do not wish to be bound by any particular theory as to the mode of operation, it is believed that our mechanical emulsion breaker is particularly effective because it brings about a thorough mixing of the emulsion with the emulsion breaking chemical.

One important advantage resulting from the use of our mechanical emulsion breaker as compared to those disclosed in the prior art is the heat savings. In prior art processes it is necessary to heat the emulsion to a temperature of about 150 to 170° F. and in addition use a chemical emulsion breaker in order to obtain satisfactory settling rates. Such a procedure consumes large quantities of gas or other fuel for heating purposes as will be apparent by inspection of the table given below. In these tests four wells were used to obtain the production data in which during the first month our mechanical emulsion breaker was not used and during the second month's operation it was used.

| Test | Production in Barrels | | Quarts Visco Flerhenol A Used | Cubic Feet of Natural Gas Used for Treating |
|---|---|---|---|---|
| | Oil | Water | | |
| Control | 4,201 | 2,113 | 106 | 400,000 |
| Emulsion Breaker Used | 4,213 | 1,941 | 46 | None |

While particular embodiments of the invention have been described, it will be apparent that many variations may be made without departing from the spirit and scope of the invention. Thus, for example, the size, the shape, and the number of the slots as well as the size and the shape of the entire apparatus may be varied without any material effect upon its operation. Many other variations will be apparent to those skilled in the art and as a consequence we contemplate to cover by the appended claims all such modifications as fall within the true spirit and scope of the invention.

We claim:
1. A fluid mixing device comprising in combination a hollow conduit provided with a sealing partition extending across the passage therethrough thus dividing said conduit into two compartments, a group of perforations in the walls of each of said compartments wherein the total cross-sectional area of the perforations in each of the two compartments is substantially equal to the cross-sectional area of said conduit, and a second conduit enclosing the first mentioned conduit in the area of said perforations and in sealing engagement with the outside of said first mentioned conduit in areas which are axially more remote from said partition than said perforations thus forming a chamber around said first mentioned conduit the cross-sectional area of said chamber being at least equal to the cross-sectional area of said first mentioned conduit.

2. A fluid mixing device comprising a housing, a hollow elongate member of greater length and smaller diameter than said housing, means fixedly and sealably mounting said elongated member in a longitudinal axial plane of said housing whereby the ends of said elongate member extend beyond the ends of said housing thus forming a chamber around said elongate member the cross-sectional area of said chamber being at least equal to the cross-sectional area of said elongate member, a sealing partition extending across the passage through said elongate member at substantially the center thereof thus dividing said elongate member into two compartments, and a group of perforations in the wall of said elongate member, within said chamber and equally spaced on each side of said sealing partition wherein the total cross-sectional area of the perforations on each side of said sealing partition is substantially equal to the cross sectional area of said elongate member.

References Cited in the file of this patent
UNITED STATES PATENTS

| 2,401,570 | Koehler | June 4, 1946 |
| 2,592,848 | Baird | Apr. 15, 1952 |
| 2,635,641 | Kasten | Apr. 21, 1953 |

FOREIGN PATENTS

| 3,470 | Great Britain | Mar. 7, 1887 |
| 333,625 | France | of 1903 |
| 545,136 | France | Oct. 1, 1922 |